US008578355B1

(12) United States Patent
Mars et al.

(10) Patent No.: US 8,578,355 B1
(45) Date of Patent: Nov. 5, 2013

(54) SCENARIO BASED OPTIMIZATION

(75) Inventors: Jason Mars, Charlottesville, VA (US);
Robert Hundt, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 622 days.

(21) Appl. No.: 12/728,099

(22) Filed: Mar. 19, 2010

(51) Int. Cl.
*G06F 9/45* (2006.01)

(52) U.S. Cl.
USPC .......................................................... 717/153

(58) Field of Classification Search
USPC ................................................ 717/127, 151
See application file for complete search history.

(56) References Cited

U.S. PATENT DOCUMENTS

| | | | | |
|---|---|---|---|---|
| 5,673,408 | A * | 9/1997 | Shebanow et al. | 712/216 |
| 6,615,340 | B1 * | 9/2003 | Wilmot, II | 712/209 |
| 7,543,285 | B2 * | 6/2009 | Cabillic et al. | 717/158 |
| 2007/0079294 | A1 * | 4/2007 | Knight et al. | 717/130 |
| 2007/0214342 | A1 * | 9/2007 | Newburn et al. | 712/216 |
| 2009/0064117 | A1 * | 3/2009 | Bashkansky et al. | 717/154 |

OTHER PUBLICATIONS

Adl-Tabatabai et al., "Prefetch injection based on hardware monitoring and object metadata," Proceedings of the ACM SIGPLAN 2004 conference on Programming language design and implementation, 2004, New York, NY, USA: ACM, pp. 267-276, 10 pages.
Azimi et al., "Online performance analysis by statistical sampling of microprocessor performance counters," Proceedings of the 19th annual international conference on Supercomputing, 2005, New York, NY, USA: ACM, pp. 101-110, 10 pages.
Bala et al., "Dynamo: a transparent dynamic optimization system," Proceedings of the ACM SIGPLAN 2000 conference on Programming language design and implementation, Jun. 2000, New York, NY, USA: ACM, pp. 1-12, 12 pages.
Bruening et al., "An infrastructure for adaptive dynamic optimization," Proceedings of the international symposium on Code generation and optimization, 2003, Washington, DC, USA: IEEE Computer Society, pp. 265-275,11 pages.
Callahan et al., "Interprocedural constant propagation," SIGPLAN Not., Jul. 1986, vol. 21, No. 7, pp. 162-175, 10 pages.
Carini et al., "Flow-sensitive interprocedural constant propagation," in PLDI '95: Proceedings of the ACM SIGPLAN 1995 conference on Programming language design and implementation, 1995, New York, NY, USA: ACM, pp. 23-31, 9 pages.
Cavazos et al., "Rapidly selecting good compiler optimizations using performance counters," in Proceedings of the International Symposium on Code Generation and Optimization, Apr. 2007, Washington, DC, USA: IEEE Computer Society, pp. 185-197, 13 pages.
Chang et al., "Using profile information to assist classic code optimizations," Softw. Pract. Exper., 1991, vol. 21, No. 12, pp. 1301-1321, 33 pages.

(Continued)

*Primary Examiner* — Li B Zhen
*Assistant Examiner* — Hui-Wen Lin
(74) *Attorney, Agent, or Firm* — Honigman Miller Schwartz and Cohn LLP (57) ABSTRACT

Techniques and systems for scenario based optimization can include generating multiple different versions of a program segment based on different respective execution scenarios associated with an execution of a program, the program operable to use the program segment versions. In another aspect, techniques and systems can include executing a program executable associated with multiple different versions of a program segment, analyzing the execution for an indication of at least one of the execution scenarios to select one of the program segment versions based on the indication, and causing the execution to use the selected program segment version during at least a portion of the execution.

18 Claims, 7 Drawing Sheets

(56) References Cited

OTHER PUBLICATIONS

Chen et al., "Dynamic trace selection using performance monitoring hardware sampling," Proceedings of the international symposium on Code generation and optimization, 2003, Washington, DC, USA: IEEE Computer Society, pp. 79-90, 12 pages.

Chilimbi et al., "Dynamic hot data stream prefetching for general-purpose programs," Proceedings of the ACM SIGPLAN 2002 Conference on Programming language design and implementation, 2002, New York, NY, USA: ACM, pp. 199-209, 11 pages.

Cierniak et al., "Interprocedural array remapping," Proceedings of the 1997 International Conference on Parallel Architectures and Compilation Techniques, Mar. 1997, Washington, DC, USA: IEEE Computer Society, p. 146-155, 10 pages.

Dean et al., "Profileme: Hardware support for instruction-level profiling on out-of-order processors," MICRO 30: Proceedings of the 30th annual ACM/IEEE international symposium on Microarchitecture, Dec. 1997, Washington, DC, USA: IEEE Computer Society, pp. 292-302, 12 pages.

Fursin et al., "Practical run-time adaptation with procedure cloning to enable continuous collective compilation," Proceedings of the GCC Developers' Summit, Jul. 2007, 10 pages.

Fursin et al., "Quick and practical run-time evaluation of multiple program optimizations," Trans. on High Performance Embedded Architectures and Compilers, Jan. 2007, vol. 1, No. 1, pp. 13-31, 19 pages.

Gupta et al., "Resource-sensitive profile-directed data flow analysis for code optimization," Proceedings of the 30th annual ACM/IEEE international symposium on Microarchitecture, 1997, Washington, DC, USA: IEEE Computer Society, pp. 358-368, 11 pages.

Hiser et al., "Evaluating indirect branch handling mechanisms in software dynamic translation systems," Proceedings of the International Symposium on Code Generation and Optimization, Apr. 2007, Washington, DC, USA: IEEE Computer Society, pp. 61-73, 13 pages.

Lu et al., "Dynamic helper threaded prefetching on the sun UltraSPARCO® processor," Proceedings of the 38th annual IEEE/ACM International Symposium on Microarchitecture, Dec. 2005, Washington, DC, USA: IEEE Computer Society, pp. 93-104, 12 pages.

Lu et al., "The performance of runtime data cache prefetching in a dynamic optimization system," Proceedings of the 36th annual IEEE/ACM International Symposium on Microarchitecture, 2003, Washington, DC, USA: IEEE Computer Society, 11 pages.

Luk et al., "Pin: building customized program analysis tools with dynamic instrumentation," Proceedings of the 2005 ACM SIGPLAN conference on Programming language design and implementation. New York, NY, USA: ACM, 2005, pp. 190-200.

Mars et al., "Multicore adaptive trace selection," Appeared at STMCS '08: Third Workshop on Software Tools for MultiCore Systems, Mar. 2008. [Online]. Available: http://www.cs.virginia.edu/jom5x/papers/mats.pdf, 6 pages.

Mars et al., "Scenario Based Optimization: A Framework for Statically Enabling Online Optimizations", International Symposium on Code Generation and Optimization, Mar. 22, 2009, 11 pages.

Nethercote et al., "Valgrind: a framework for heavyweight dynamic binary instrumentation," in Proceedings of the 2007 ACM SIGPLAN conference on Programming language design and implementation, 2007, New York, NY, USA: ACM, pp. 89-100, 12 pages.

Pettis et al., "Profile guided code positioning," Proceedings of the ACM SIGPLAN 1990 conference on Programming language design and implementation, 1990, New York, NY, USA: ACM, pp. 16-27, 12 pages.

Rajagopalan et al., "Profile-directed optimization of event-based programs," Proceedings of the ACM SIGPLAN 2002 Conference on Programming language design and implementation, 2002, New York, NY, USA: ACM, pp. 106-116, 11 pages.

Schneider et al., "Online optimizations driven by hardware performance monitoring," Proceedings of the 2007 ACM SIGPLAN conference on Programming language design and implementation, 2007, New York, NY, USA: ACM, pp. 373-382, 10 pages.

Scott et al., "Retargetable and reconfigurable software dynamic translation," Proceedings of the international symposium on Code generation and optimization, 2003, Washington, DC, USA: IEEE Computer Society, pp. 36-47, 12 pages.

Zhang et al., "An event-driven multithreaded dynamic optimization framework," Proceedings of the 14th International Conference on Parallel Architectures and Compilation Techniques, Oct. 2005, Washington, DC, USA: IEEE Computer Society, pp. 87-98, 12 pages.

Zhao et al., "An approach toward profit-driven optimization," ACM Trans. Archit. Code Optim., 2006, vol. 3, No. 3, pp. 231-262, 32 pages.

\* cited by examiner

SCENARIO BASED OPTIMIZATION

TECHNICAL FIELD

This document relates to compiling and executing computer programs.

BACKGROUND

Modern computer programs are typically written in a high-level programming language. A high-level programming language allows data structures and algorithms in a computer program to be expressed in a form that can be easily read and understood by a human programmer. A software tool, called a "compiler," can translate a computer program written in a high-level programming language into a set of low-level machine instructions that can be executed by a computer's microprocessor. In the context of this translation, the program written in the high-level programming language is called the "source code." The set of low-level machine instructions is called "object code." In practice, a program typically includes multiple source code files from which a number of object files can be derived. These multiple object files and various libraries that include standard routines can be linked by a "linker" to create a single executable program. The executable program can then be executed on a computer.

SUMMARY

This document describes technologies relating to performing scenario based optimizations of computer programs and their execution.

Methods for scenario based optimizations can include generating multiple different versions of a program segment based on different respective execution scenarios associated with an execution of a program, the program operable to use the program segment versions, generating a switching mechanism to associate the program segment with the program segment versions and to invoke one or more of the program segment versions during an execution of the program based on an input associated with at least one of the execution scenarios, generating a control mechanism to monitor an execution of the program and to identify one or more of the execution scenarios during an execution of the program and to provide the input to the switching mechanism based on an identified execution scenario, and producing an output based at least on the program segment versions, the switching mechanism, and the control mechanism. Other implementations can include corresponding systems, apparatus, and computer programs, configured to perform the actions of the methods, encoded on computer storage devices.

These and other implementations can include one or more of the following features. Generating multiple different versions of a program segment can include generating a first program segment version associated with a first execution scenario and generating a different, second program segment version associated with a second execution scenario. The second program segment version being based on one or more optimization techniques. The first execution scenario can be indicative of a contention of one or more execution resources during an execution of the program. The second execution scenario can be indicative of an execution environment suitable to execute processor instructions associated with the one or more optimization techniques.

Generating the control mechanism can include generating the control mechanism to monitor an instruction retirement rate associated with an execution of the program and to provide the input to the switching mechanism based on different instruction retirement rate thresholds. Producing the output can include producing a program executable corresponding to the program. The program executable can include the program segment versions, the switching mechanism, and the control mechanism.

Methods for executing a program executable associated with one or more scenario based optimizations can include executing a program executable associated with multiple different versions of a program segment, the program segment versions being associated with different execution scenarios, respectively; analyzing the execution for an indication of at least one of the execution scenarios to select one of the program segment versions based on the indication; and causing the execution to use the selected program segment version during at least a portion of the execution. Other implementations can include corresponding systems, apparatus, and computer programs, configured to perform the actions of the methods, encoded on computer storage devices.

These and other implementations can include one or more of the following features. Analyzing the execution can include monitoring the execution and selecting one of the program segment versions associated with an execution scenario detected by the monitoring. Executing the program executable can include first executing a first one of the program segment versions and second executing a second one of the program segment versions. Analyzing the execution can include comparing a first performance metric associated with the first executing and a second performance metric associated with the second executing. Analyzing the execution can include selecting a program segment version based on an output of the comparison. Monitoring the execution can include accessing one or more event counters associated with processor electronics.

Executing the program executable can include accessing one or more of the program segment versions in the program executable. The program segment versions can include different program segment versions based on different optimizations of the program segment. Executing the program executable can include interfacing with a module that includes the program segment versions. Executing the program executable can include the analyzing.

Particular embodiments of the subject matter described in this document can be implemented so as to realize one or more of the following advantages. A scenario based optimization framework allows compiler writers to take advantage of the benefits of static compile-time optimizations and run-time advantages of varying program execution based on a changing execution environment. For example, compiler writers can develop additional optimizations based on a hybrid static and dynamic collaborative scenario based optimization paradigm. Compilers can be updated to perform scenario based optimizations. Executing scenario based optimized program executables can increase the run-time performance of the program.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some compiler optimizations may be advantageous in some execution scenarios and disadvantageous in others. An execution scenario describes a occurrence or set of occurrences such as micro-architectural events, operating system events, or input/output events in an execution environment of a program. Detection of a specific scenario can indicate when an optimization may yield improved performance. For example, one scenario can be when cache misses are increasing as a result of multiple applications contending for a cache. For such a scenario, an optimization such as cache prefetching may degrade performance. However, in another scenario when utilization of the cache is low, using cache prefetching may significantly improve performance.

With the proliferation of multiple core architectures, multiple programs can run simultaneously alongside each other can impact overall performance. In some cases, such an impact may result from an increased pressure on system resources, e.g., memory, input/output, processor cores, of an execution environment that is shared by multiple running applications. Hence, a scenario can include resource thrashing between one or more applications. In some cases, during an execution of a program, resource thrashing can occur when another program is launched on a neighboring core that causes thrashing between the two programs. In another example, a scenario can include events that are indicative of when an on-chip bus is oversubscribed. Some scenarios may have an adverse impact on application performance and can occur at anytime or not at all. In some implementations, a default scenario can represent an execution environment with minimal or no performance impacting events such as an idle bus or idle processor core. In some cases, the impact of an optimization is not fully known during compile-time. A corresponding scenario can be when an execution of an optimized version of a function is performing worse than an execution of an another version of the function or an expected performance threshold.

This document includes descriptions of techniques and systems for scenario based optimization (SBO). A SBO framework can provide a hybrid static and dynamic approach to optimization that includes compile-time and run-time components. The SBO framework can use benefits of static compiler optimizations to generate multi-versioned program segments and the adaptive nature of dynamic optimization techniques to selectively execute one or more of the program segment versions during an execution of a program. A compiler can select one or more segments of a program for multi-versioning based on one or more selection criteria, such as frequency of execution of a segment.

A program such as an application or an operation system can include one or more program segments. Various examples of a program segment include a function, a sequence of operations, a group of functions, and a group of operations within a function. In some implementations, an application can link to a program segment via a library interface. A program segment can be optimized differently for different scenarios. Various optimizations include loop unrolling, cache prefetching, multi-threading, instruction re-scheduling, function inlining and different degrees thereof, for example. Other optimizations are possible, however. A SBO framework performs multi-versioning to generate different program segment versions for a specific program segment such as a function, a grouping of operations, or a grouping of functions. For example, a version for a function can be statically generated by a compiler and specialized to an anticipated scenario. During run-time, scenarios can be identified by a control mechanism such as a dynamic engine that uses performance monitoring hardware. When a scenario is identified, execution is dynamically rerouted to execute an appropriate version of the function.

An execution framework for SBO can interface with computer hardware to dynamically change execution pathways of a program while the program is executing. For example, various processor architectures include performance monitoring hardware (PMH) structures. Performance monitoring hardware can provide accurate descriptions of an execution environment of an application or an entire system. An execution framework can use PMH structures to count and monitor events such as micro-architectural events of a chip in real-time. For example, such a framework can use one or more PMH structures to collect fine grain, accurate information with low overhead to re-route an application's execution stream, e.g., selecting a different program segment version.

Figure 1:
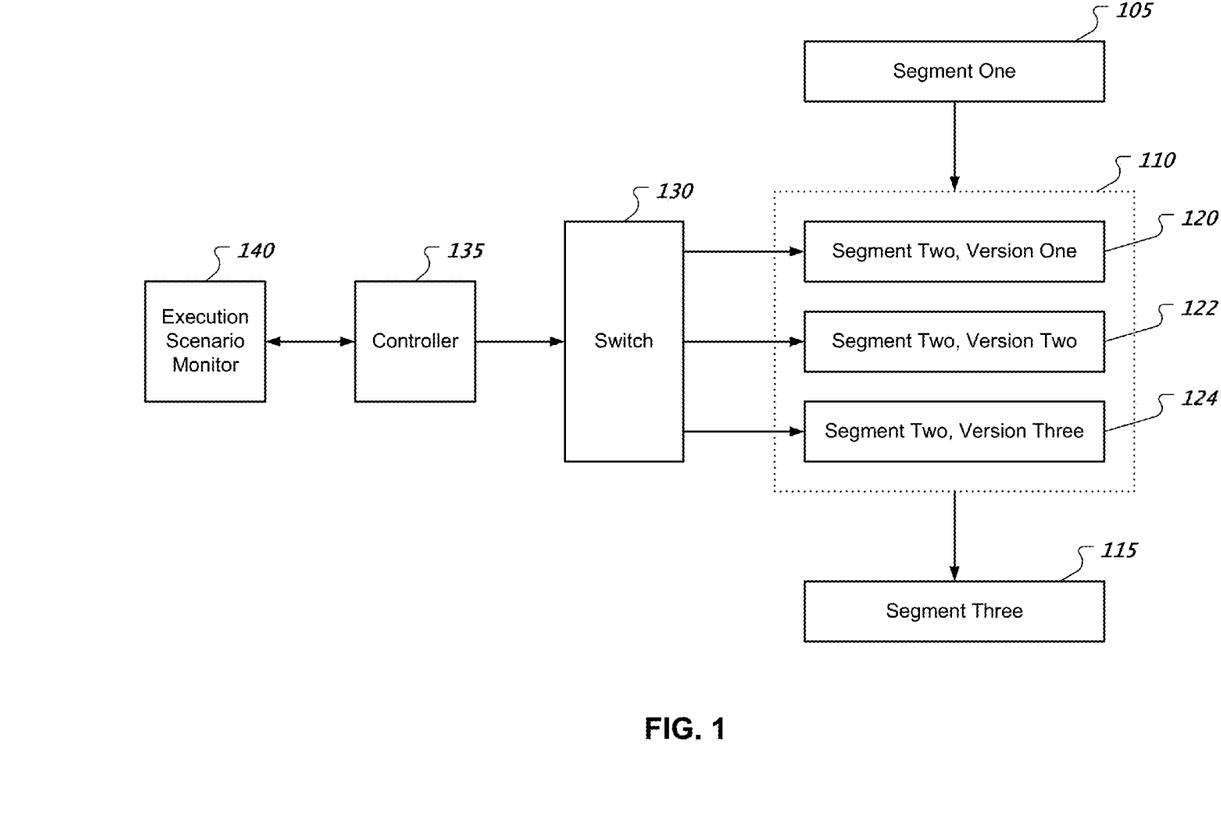
FIG. 1 shows an example of a scenario based execution architecture to execute a program.

FIG. 1 shows an example of a scenario based execution architecture to execute a program. In this example, a program has multiple program segments 105, 110, 115. In some implementations, an executable version of the program can include processor instructions indicative of the one or more program segments 105, 110, 115. In some implementations, an executable version of the program can link to a program segment located within a module such as a library.

A multi-versioned program segment, e.g., segment two 110, is associated with multiple versions 120, 122, 124 of a program segment. Different versions can correspond to different execution scenarios. In some implementations, a program executable can include multiple versions 120, 122, 124 of a program segment 110. In some implementations, a program executable can link to a library that includes multiple versions 120, 122, 124 of a program segment 110.

During execution, control flow can switch from one program segment to a different program segment. Switching to a multi-versioned program segment can include changing control flow to a switch 130 associated with the multi-versioned program segment 110. The switch 130 can direct control flow to one of the multiple versions 120, 122, 124.

A controller 135 can operate an execution scenario monitor 140 to detect one or more execution scenarios. The controller 135 can select one of the versions 120, 122, 124 based on a detected execution scenario. In some implementations, the controller 135 can write an address corresponding to a program segment version 120, 122, 124 to a memory location that is accessible by the switch 130. The switch 130 can read the memory location and direct control flow to the version corresponding to the address stored at the memory location.

Running the program executable can include executing instructions for the program segments 105, 110, 115 with the controller 135, execution scenario monitor 140, and switch 130 in the same thread. In some implementations, running a program executable can include running the program segments 105, 110, 115 in one or more threads and running the controller 135 in a separate thread. In some implementations, running a program executable can include running the program segments 105, 110, 115 in one or more processes using inter-process communications and interfacing with a process that performs monitoring.

A program executable can include processor instructions for multiple different versions of a program segment based on different execution scenarios. In some implementations, an execution scenario is associated with an occurrence of one or more specific events. In some implementations, an execution scenario is associated with a lack of an occurrence of one or more specific events.

In some implementations, a program executable can include processor instructions for a switching mechanism that selects a version of multi-versioned program segment. In some implementations, a program executable can include processor instructions for a switching mechanism to associate the program segment with the program segment versions and to invoke one or more of the program segment versions during an execution of the program based on an input associated with at least one of the execution scenarios.

In some implementations, a program executable can include processor instructions for a control mechanism to monitor execution and to identify one or more of the execution scenarios during an execution of the program. In some implementations, the control mechanism can provide an input to the switching mechanism based on an identified execution scenario.

Figure 2:
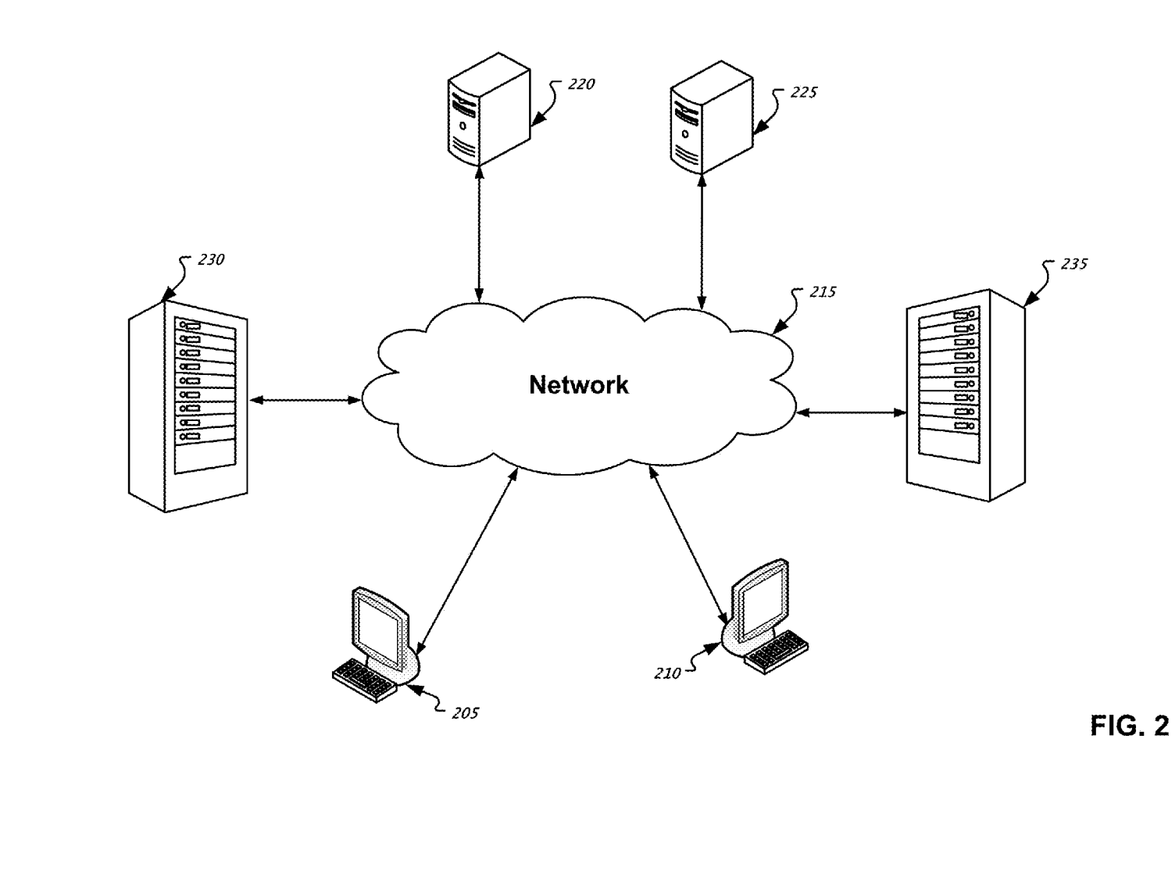
FIG. 2 shows an example of a communication network connected with processing devices.

FIG. 2 shows an example of a communication network connected with processing devices. Processing devices such as network endpoints 205, 210, 220, 225, 230, 235 can connect to a communication network 215 such as the Internet or a Local Area Network (LAN). Various examples of endpoints include processing devices such as a mobile phone, personal computer 205, 220 or a computer such as a server 220, 225, 230, 235. An endpoint can include one or more processors that can be programmed or configured to perform one or more operations mentioned in this document. In some implementations, a processor can include multiple processors or processor cores. A network endpoint can be identified as a client, a server, or both, but in any case, a network endpoint necessarily includes some hardware since it includes a physical device.

Endpoints 205, 210, 220, 225, 230, 235 can establish connections with other endpoints 205, 210, 220, 225, 230, 235. For example, a first server 220 can generate a program executable based on SBO and a second server 225 can retrieve the program executable over a networked file system. The second server 225 can execute the program executable, which can cause the second server 225 to communicate with a computer 230, 235. In some implementations, a Transmission Control Protocol (TCP) over the Internet Protocol (IP) can be used to transport data such as a program executable or output of a program executable between network endpoints 205, 210, 220, 225, 230, 235.

In some implementations, compilers can statically predict one or more possible run-time scenarios an application may face. Compilers can use optimization techniques that take advantage of static compile-time optimization techniques, dynamic monitoring, execution routing to enact one or more execution policies. Performance of optimized program segments may depend on the execution environment. For example, code optimizations can improve or degrade performance in different execution environments. An execution environment can change during an execution of a program or between successive executions of the program due to scenarios such as ones based on interrupts, tasks on neighboring cores, or memory bus contention. Therefore, a SBO based compiler can perform multi-versioning based on static optimization techniques in a way to achieve run-time flexibility.

A SBO based compiler can use a static scenario based multi-versioning (SSBM) mechanism to generate compiler output. Various SBO based compiler outputs such as object code and program executables can include multiple program segment versions. Compiler outputs can include or can link to a dynamic engine that monitors one or more system components such as one or more processors, memory, input/output channels, and operating system events. In some implementations, a compiler can include inter-procedural code transformation mechanisms such as function level multi-versioning. A function level multi-versioning mechanism can generate specialized versions of a function that target different scenarios.

Switching mechanisms for SBO can provide an interface between static function versions and a dynamic engine that selects the versions during an execution. In some implementations, a dynamic engine can use such a interface to hook into an execution of a program executable and reroute the execution via resetting the active versions of the functions. A switching mechanisms can use a mechanism such as a trampoline to multiplex between the program segment versions. A trampoline can load a specific version based on one or more inputs.

An alternate versioning switching mechanism is based on default and alternate function versions. Alternate versioning implementations can use a global switch to control which version the application uses during execution. A dynamic engine can write information to the a memory location that stores the state of the global switch. In some implementations, a program executable based on alternate versioning can either execute the default versions for one or more multi-versioned functions or their corresponding alternative versions.

Figure 3:
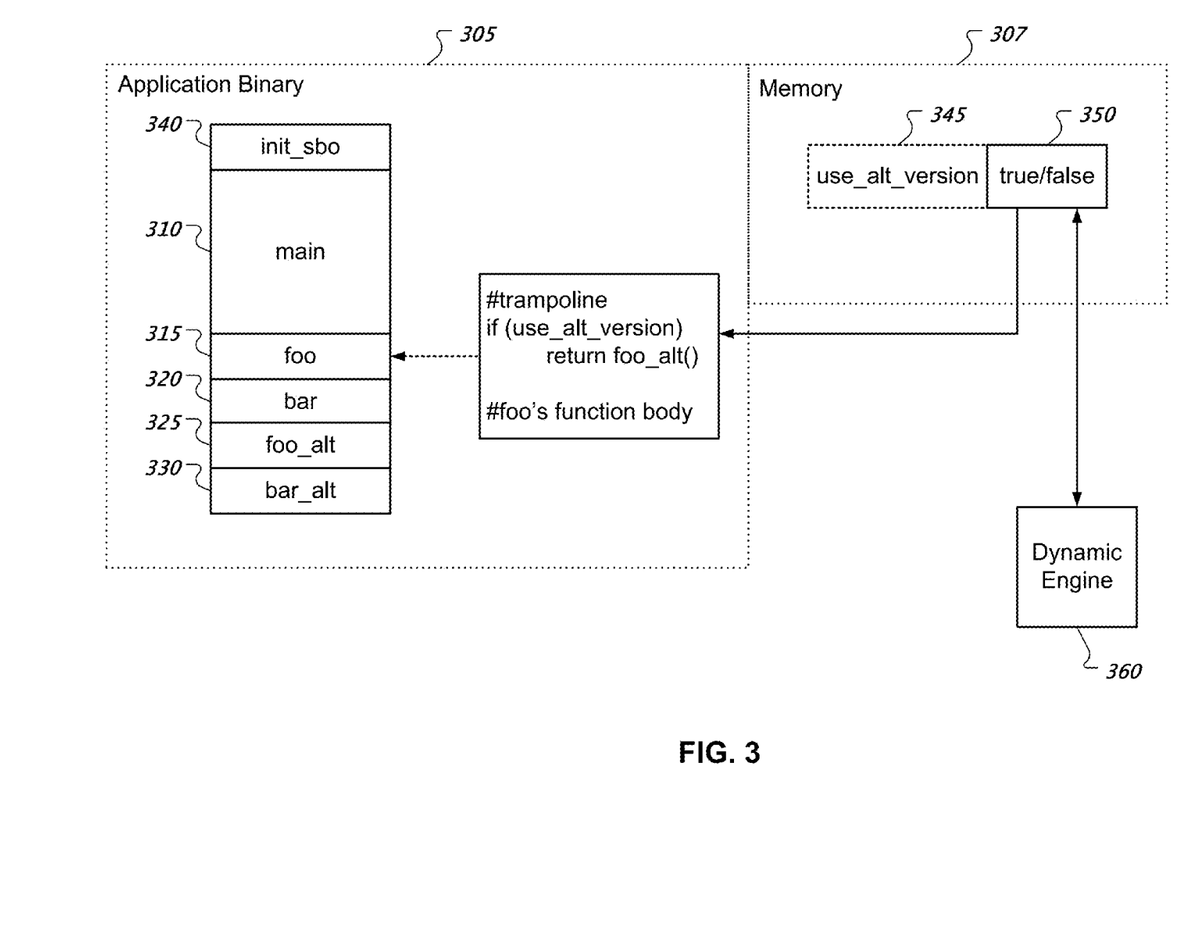
FIG. 3 shows an example of a switching mechanism based on alternate versioning.

FIG. 3 shows an example of a switching mechanism based on alternate versioning. In this example, a program executable such as an application binary 305 includes various segments such as a main segment 310 and multi-versioned functions such as foo 315, bar 320 and corresponding alternate versions such as foo_alt 325 and bar_alt 330. An application binary 305 can include code to initialize SBO based mechanisms such as a switching mechanism. An application binary 305 can access a memory region 307 such as a statically or dynamically allocated memory region. For example, an application binary 305 can include a routine, e.g., init_sbo 340, to initialize a value 350 labeled use_alt_version 345, to be true or false. Such a value 350 can be stored a specific memory location in memory region 307.

Default versions of a function, e.g., foo 315, bar 320, can include a trampoline mechanism to read the value 350 labeled "use_alt_version" 345 to make a determination as to whether to use an alternate version of the function, e.g., foo_alt 325, bar_alt 330. A compiler can inject code for a trampoline mechanism at a beginning portion of a function's default version.

A control mechanism such as a dynamic engine 360 can write to the value 350 labeled "use_alt_version" 345 to control a switching mechanism to use the alternate versions. The dynamic engine 360 can update the value 350 one or more times during an execution of the application binary 305. In some implementations, an application binary 305 includes code for, or links to a dynamic engine 360.

An n-version versioning switching mechanism can use multiple versions for one or more specific functions. In an n-version versioning technique, a call to a multi-versioned function becomes an indirect call to a version indicated by a mapping table entry. In some implementations, a mapping table is maintained in memory for one or more multi-versioned functions. During execution, the target address of a call is controlled by a dynamic engine.

N-version versioning can be advantageous, for example, when multiple scenarios can occur at the same time. In some implementations, a dynamic engine can produce different combinations of function versions to correspond to different combinations of scenarios.

Figure 4:
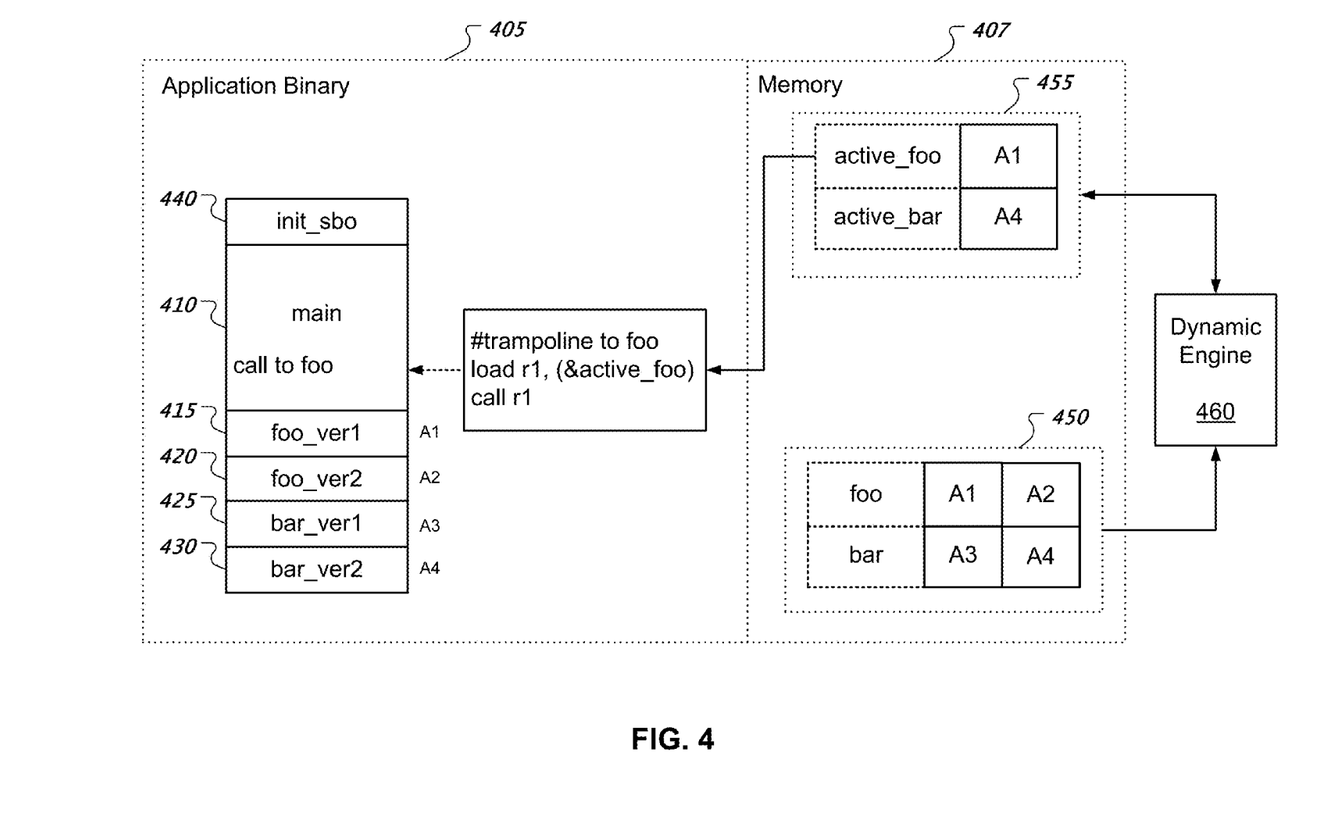
FIG. 4 shows an example of a switching mechanism based on n-version versioning.

FIG. 4 shows an example of a switching mechanism based on n-version versioning. In this example, a program executable such as an application binary 405 includes various segments such as a main segment 410 and multi-versioned functions such as foo_ver1 415, foo_ver2 420, bar_ver1 425, and bar_ver2 430. An application binary 405 can include code to initialize SBO based mechanisms such as a switching mechanism. An application binary 405 can access a memory region 407 such as a statically or dynamically allocated memory region.

An application binary 405 can include a routine, e.g., init_sbo 440, to initialize the memory region 407. For example, init_sbo 440 can write a version index table 450 and an active table 455 to the memory region 407. In some implementations, a version index table 450 can include memory addresses, e.g., A1, A2, A3, and A4, for multiple versions of one or more functions. A version index table 450 can provide a mapping between a scenario and a specific version of a function. An active table 455 can include addresses of respective active function versions. In some implementations, init_sbo 440 can initialize the active table 455 based on initial function version settings.

A program segment such as main 410 can include a call to function foo. In some implementations, a SBO based compiler can replace the call to function foo with instructions to perform an indirect call to a version of function foo. An indirect call can include loading a pointer to the active version of foo from an active table 455 to a register and calling the active version via the value in register. In some implementations, a SBO based compiler can replace the call to function foo with a call to a switching function.

A dynamic engine 460 can access a version index table 450 to retrieve information about multi-versioned functions. The dynamic engine 460 can update the active table 455 based on monitoring an execution. In some implementations, the dynamic engine 460 can write a pointer to a function version to the active table 455 during execution. In some implementations, the dynamic engine 460 can run as a separate thread.

A compiler can perform multiple passes, including one or more SBO based passes. For example, a compiler can perform one or more parsing passes where the text of a source code associated with a program is processed. The compiler can generate an intermediate representation (IR) based on the parsing passes. The compiler can perform a SBO pass based on an intermediate representation. In some implementations, a SBO pass is performed after the pass where the earliest IR is generated as the first inter-procedural pass. This can facilitate increased flexibility for compiler writers to design how SBO function versions can be configured. For example, a function can be annotated to disable or enable one or more of the optimizations in later passes. The compiler can provide a compiler flag to specify a function for multi-versioning. The compiler can perform tree Static Single Assignment (SSA) passes to optimize the IR, which can include a SBO based IR. The compiler can perform Register Transfer Language (RTL) passes to perform low level optimizations and to generate processor instructions.

In some implementations, a compiler can instrument a program executable with a monitor to perform profiling and later perform SBO based on the results of the profiling. Profiling can include determining the frequency of use of different functions within a program to ascertain which functions are heavily used. A compiler can use profiling results to select one or more functions for SBO. Being selective can reduce overall growth of the program executable. In some implementations, a compiler can take in to consideration potential overhead of using multi-versioned program segments, e.g., extra instructions associated with an indirect call, when selecting functions for SBO.

A compiler can use one or more switching mechanisms to multiplex versions of a multi-versioned program segment. In some implementations, a compiler can provide a function and call graph cloning routine for inter-procedural constant propagation. A SBO compiler pass can use this routine to clone internal function data structures. The SBO compiler pass can rewrite the internals of a original function. In some implementations, a function is rewritten to include a trampoline that a dynamic engine can manipulate via one or more shared memory hooks. In some implementations, a call to a function is rewritten to include a trampoline that a dynamic engine can manipulate.

A compiler can use alternate versioning to implement a switching mechanism. For example, an original function can be modified to include at least a portion of a switching mechanism. A switching mechanism can include a conditional operation, e.g., a trampoline, to jump to an alternate version. In some implementations, the compiler can inject one or more basic blocks into an original version of function at a beginning portion such as its head. The one or more injected basic blocks can check an indicator such as a global variable. If the global variable indicates alternative version use, the alternative version is called using a direct call. If present, the calling parameters that are passed to the original version are passed on to the alternate version. If applicable, value(s) returned from the alternate version are then passed on to the original call site. If the global variable indicates original version use, control flow proceeds to the body of the original version.

A compiler can use n-version versioning to implement a switching mechanism. Such a mechanism can include an indirect call technique. For example, a call to a function is replaced with a trampoline that has an indirect call to one of the versions. A dynamic engine can control this trampoline by writing the address of a function version in the address location that the indirect call uses. The compiler can generate a switching mechanism to access data such as an active table and a version index table and to provide an interface to a dynamic engine.

In some implementations, a SBO compiler pass can inject one basic block into the head of the main function of an application. This basic block can include a call to a SBO initialization routine. The routine can initialize data associated with SBO. The routine can launch a dynamic engine. The routine can launch a monitor to monitor execution. In some implementations, the dynamic engine includes the monitor.

A dynamic engine can monitor the execution context of an application to detect a scenario. The dynamic engine can reroute execution to a program segment version that is suited for the detected scenario. The dynamic engine can perform performance monitoring hardware to continually identify the current execution context of a host application. The dynamic engine can interface with a performance monitor such as OProfile, PAPI, and Perfmon2.

In some implementations, a SBO based compiler can statically generate binaries with specialized versions of one or more functions and provide hooks for the dynamic engine. In some implementations, the dynamic engine can then use one or more heuristics to reroute execution via control through these hooks.

A SBO initialization routine can initialize one or more counters and one or more timers to periodically execute an analysis routine. An analysis routine can read the counters such as counters associated with micro-architectural events, e.g., cache misses or branch mis-predicts. The analysis routine can run a scenario detection routine to detect a scenario based on the counter values. If a target scenario is detected, the dynamic engine can reconfigure the executing binary to execute the function versions associated with the detected scenario. The analysis routine can reset the counters and the timer.

A SBO framework can include selectively executing program segment versions that have one or more aggressive optimizations, such as aggressive cache prefetching or aggressive loop unrolling. Aggressive optimizations may improve performance in some case and degrade performance in others. A program executable can repeatedly call a multi-versioned function. During program execution, different versions can be called to determine performance metrics of different versions. In some implementations, a dynamic engine can reroute execution based on a metric indicative of relative performance of different versions. Program executables associated with aggressive optimizations may benefit from an adaptive online optimization approach. In some implementations, a SBO framework can be used to detect whether an aggressively optimized version is performing better than another version such as a less aggressively optimized version or a non-aggressively optimized version.

Figure 5:
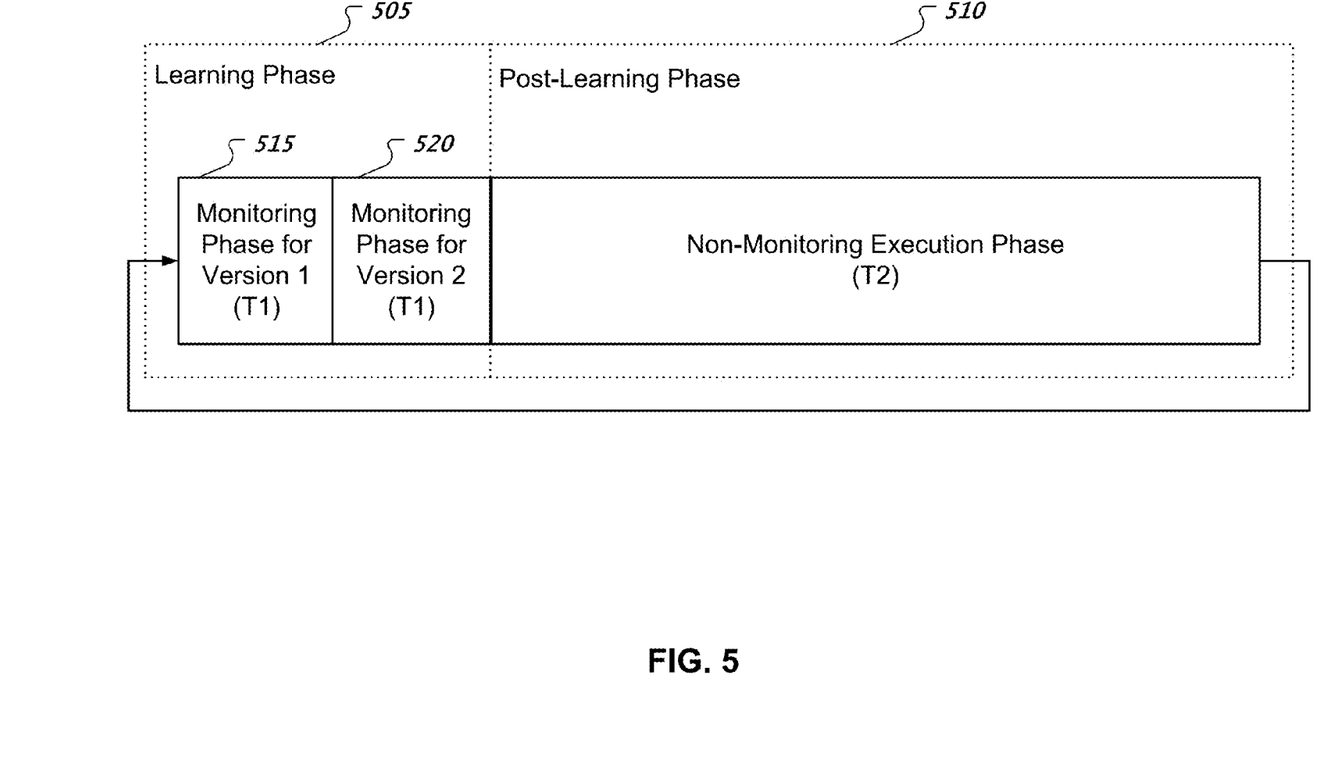
FIG. 5 shows an example of different execution phases associated with performance based metrics.

FIG. 5 shows an example of different execution phases associated with performance based metrics. A SBO based program execution can include a learning phase 505 and a post-learning phase 510. The learning phase 505 can include executing first and second function versions during a first phase 515 of execution and a second phase 520 of execution, respectively.

In this example, the active version for a program segment is set to a non-aggressive version for the first phase 515 of the learning phase 505. The program then executes for a period of time, T1. The dynamic engine can monitor one or more counters to look at an absolute number of instructions retired during the first phase 515. The dynamic engine can record the number of instructions that were successfully executed during the first phase 515. The active version for a program segment is set to an aggressive version for the second phase 520 of the learning phase 505. The program then executes for a period of time, T1. The dynamic engine can monitor one or more counters to look at an absolute number of instructions retired during the second phase 520.

The dynamic engine can calculate and compare performance metrics of the first and second versions during the phases 515, 520 of the learning phase 505. Based on the comparison, the dynamic engine can select a version as an active version for the post-learning phase 510. In some implementations, the dynamic engine can compare the number of instructions retired for the phases 515, 520 of the learning phase 505. The dynamic engine can select the version with the highest number of instructions retired during a time period T1 for execution in the post-learning phase 510 which can have a longer duration, T2. In some implementations, the post-learning phase 510 does not perform monitoring to reduce overhead. In some implementations, the post-learning phase 510 does include performance monitoring.

In some implementations, the dynamic engine can select the version that has exhibited the lower average cycles per instruction (CPI) for T1 time. A performance metric such as CPI can convey whether an execution environment is suited for executing aggressively optimized program segment versions. The dynamic engine can repeat the learning phase 505 in the future portion of the execution to determine whether performances of the versions have changed. In some implementations, the T1 duration is one second and the T2 duration is ten seconds. In some implementations, a dynamic engine can perform self-tuning to independently learn and respond to individual slices of code.

Figure 6:
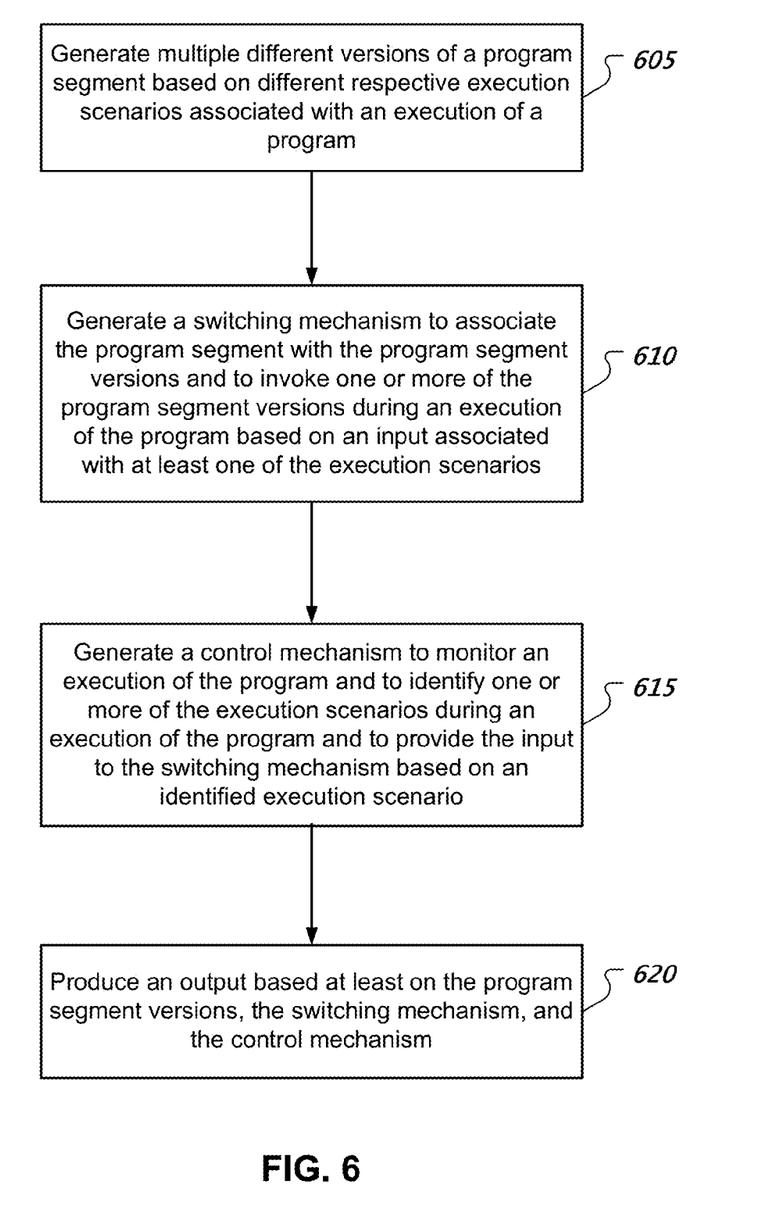
FIG. 6 shows an example of a scenario based compiler process.

FIG. 6 shows an example of a scenario based compiler process. A compiler process can generate multiple different versions of a program segment based on different respective execution scenarios associated with an execution of a program (605). The process can generate a switching mechanism to associate the program segment with the program segment versions and to invoke one or more of the program segment versions during an execution of the program based on an input associated with at least one of the execution scenarios (610).

The compiler process can generate a control mechanism to monitor an execution of the program and to identify one or more of the execution scenarios during an execution of the program and to provide the input to the switching mechanism based on an identified execution scenario (615). In some implementations, generating the control mechanism can include generating the control mechanism to monitor an instruction retirement rate associated with an execution of the program and to provide the input to the switching mechanism based on different instruction retirement rate thresholds.

The compiler process can produce an output such as a program executable or an object file based at least on the program segment versions, the switching mechanism, and the control mechanism (620). In some implementations, producing the output can include producing a program executable corresponding to the program. The program executable can include the program segment versions, the switching mechanism, and the control mechanism.

In some implementations, generating multiple different versions of a program segment can include generating a first program segment version associated with a first execution scenario and generating a different, second program segment version associated with a second execution scenario. The second program segment version can be based on one or more optimization techniques. The first execution scenario can be indicative of a contention of one or more execution resources during an execution of the program. The second execution scenario can be indicative of an execution environment suitable to execute processor instructions associated with the one or more optimization techniques.

In some implementations, generating multiple different versions includes generating a first version without optimization and multiple versions with varying degrees of optimization. For example, one version can be generated with loop unrolling set to unroll a loop twice and a different version can be generated with loop unrolling set to three or more.

Figure 7:
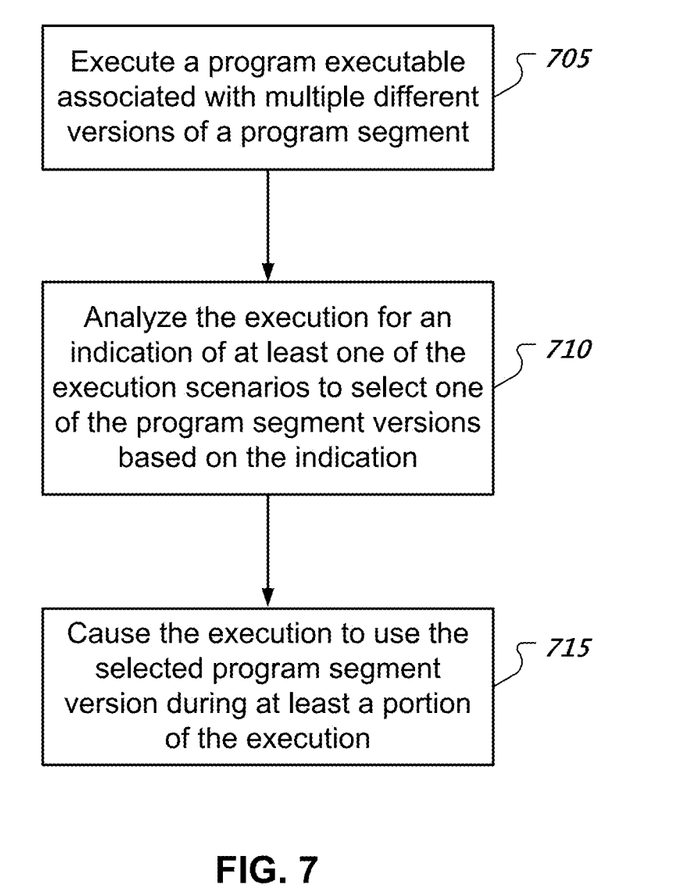
FIG. 7 shows an example of a process to execute a multi-versioned program segment.

FIG. 7 shows an example of a process to execute a multi-versioned program segment. A process can execute a program executable associated with multiple different versions of a program segment (705). The program segment versions can be associated with different execution scenarios. For example, the process can execute a program executable that includes multiple different versions of the program segment.

In another example, the process can execute a program executable that links to a module such as a library that includes multiple different versions of the program segment.

The process can analyze the execution for an indication of at least one of the execution scenarios to select one of the program segment versions based on the indication (710). In some implementations, analyzing the execution can include monitoring the execution and selecting one of the program segment versions associated with an execution scenario detected by the monitoring. In some implementations, the analysis is performed in a separate thread or process than the execution. In some implementations, executing a program executable can include performing the analysis.

Monitoring the execution can include accessing one or more event counters associated with processor electronics. Various examples of event counters include branch missprediction counter, data cache miss counter, instruction cache miss counter, processor pipeline stall counter, a miss counter associated with a translation lookaside buffer (TLB), memory bus contention counter, and an instruction retirement counter. In some implementations, instruction retirement rate can be determined based on taking a difference between different readings of an instruction retirement counter and dividing by a time period defined by the readings.

The process can cause the execution to use the selected program segment version during at least a portion of the execution (715). In some implementations, the process can run a control mechanism associated with the program executable. The control mechanism can operate a switching mechanism associated with the program executable to switch between versions of a program segment during one or more portions of the execution.

In some implementations, executing the program executable can include first executing a first one of the program segment versions and second executing a second one of the program segment versions. Analyzing the execution can include comparing a first performance metric associated with the first executing and a second performance metric associated with the second executing. Analyzing the execution can include selecting a program segment version based on an output of the comparison. Monitoring the execution can include accessing one or more event counters associated with processor electronics.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    generating multiple different versions of a program segment based on different respective execution scenarios associated with an execution of a program, the program operable to use the program segment versions, the program segment versions comprising:
        a first program segment version associated with a first execution scenario representing minimal or zero performance impacting events;
        a second program segment version associated with a second execution scenario indicative of a contention of one or more execution resources during an execution of the program; and
        a third program segment version associated with a third execution scenario indicative of an execution environment suitable to execute processor instructions associated with the one or more optimization techniques;
    generating a switching mechanism to associate the program segment with the program segment versions and to invoke one or more of the program segment versions during an execution of the program based on an input associated with at least one of the execution scenarios, the switching mechanism hooking into an execution of the program using a trampoline mechanism that reroutes the execution by setting an active program segment version or combination of program segment versions;
    generating a control mechanism to monitor an execution of the program by monitoring one or more event counters associated with the one or more execution resources to identify one or more of the execution scenarios during an execution of the program, the event counters comprising a memory bus contention counter and an instruction retirement counter, the control mechanism providing the input to the switching mechanism based on an identified execution scenario, the control mechanism monitoring an instruction retirement rate associated with the execution of the program and providing the input associated with the at least one execution scenario to the switching mechanism based on different instruction retirement rate thresholds or a memory bus contention count; and producing an output based at least on the program segment versions, the switching mechanism, and the control mechanism.

2. The method of claim 1, wherein producing the output comprises producing a program executable corresponding to the program, the program executable including the program segment versions, the switching mechanism, and the control mechanism.

3. A method performed by a data processing apparatus, the method comprising:
 executing a program executable associated with multiple different versions of a program segment, the program segment versions being associated with different execution scenarios, respectively, and comprising:
  a first program segment version associated with a first execution scenario representing minimal or zero performance impacting events;
  a second program segment version associated with a second execution scenario indicative of a contention of one or more execution resources during an execution of the program; and
  a third program segment version associated with a third execution scenario indicative of an execution environment suitable to execute processor instructions associated with the one or more optimization techniques;
 analyzing the execution for an indication of at least one of the execution scenarios to select one of the program segment versions based on the indication, wherein analyzing the execution comprises:
  monitoring one or more event counters associated with the one or more execution resources to identify one or more of the execution scenarios during an execution of the program, the event counters comprising a memory bus contention counter and an instruction retirement counter;
  monitoring an instruction retirement rate associated with the execution of the program;
  providing the input associated with the at least one execution scenario to a switching mechanism based on different instruction retirement rate thresholds or a memory bus contention count, the switching mechanism hooking into an execution of the program using a trampoline mechanism that reroutes the execution by setting an active program segment version or combination of program segment versions; and
  selecting one of the program segment versions associated with an execution scenario detected by the monitoring; and
 causing the execution to use the selected program segment version during at least a portion of the execution.

4. The method of claim 3, wherein executing the program executable comprises:
 first executing a first one of the program segment versions; and
 second executing a second one of the program segment versions.

5. The method of claim 4, wherein analyzing the execution comprises:
 comparing a first performance metric associated with the first executing and a second performance metric associated with the second executing; and
 selecting a program segment version based on an output of the comparison.

6. The method of claim 3, wherein monitoring the execution comprises accessing one or more event counters associated with processor electronics.

7. The method of claim 3, wherein executing the program executable comprises accessing one or more of the program segment versions in the program executable, wherein the program segment versions include different program segment versions based on different optimizations of the program segment.

8. The method of claim 3, wherein executing the program executable comprises interfacing with a module that includes the program segment versions.

9. The method of claim 3, wherein executing the program executable comprises the analyzing.

10. A system comprising:
 a machine readable storage device including a program product; and
 one or more processors configured to execute the program product to perform operations comprising:
 generating multiple different versions of a program segment based on different respective execution scenarios associated with an execution of a program, the program operable to use the program segment versions, the program segment versions comprising:
  a first program segment version associated with a first execution scenario representing minimal or zero performance impacting events;
  a second program segment version associated with a second execution scenario indicative of a contention of one or more execution resources during an execution of the program; and
  a third program segment version associated with a third execution scenario indicative of an execution environment suitable to execute processor instructions associated with the one or more optimization techniques;
 generating a switching mechanism to associate the program segment with the program segment versions and to invoke one or more of the program segment versions during an execution of the program based on an input associated with at least one of the execution scenarios, the switching mechanism hooking into an execution of the program using a trampoline mechanism that reroutes the execution by setting an active program segment version or combination of program segment versions;
 generating a control mechanism to monitor an execution of the program by monitoring one or more event counters associated with the one or more execution resources to identify one or more of the execution scenarios during an execution of the program, the event counters comprising a memory bus contention counter and an instruction retirement counter, the control mechanism providing the input to the switching mechanism based on an identified execution scenario, the control mechanism monitoring an instruction retirement rate associated with the execution of the program and providing the input associated with the at least one execution scenario to the switching mechanism based on different instruction retirement rate thresholds or a memory bus contention count; and
 producing an output based at least on the program segment versions, the switching mechanism, and the control mechanism.

11. The system of claim 10, wherein producing the output comprises producing a program executable corresponding to the program, the program executable including the program segment versions, the switching mechanism, and the control mechanism.

12. A system comprising:
memory configured to store information associated with an execution of a program executable, wherein the program executable is associated with multiple different versions of a program segment, the program segment versions being associated with different execution scenarios, respectively, and comprising:
- a first program segment version associated with a first execution scenario representing minimal or zero performance impacting events;
- a second program segment version associated with a second execution scenario indicative of a contention of one or more execution resources during an execution of the program; and
- a third program segment version associated with a third execution scenario indicative of an execution environment suitable to execute processor instructions associated with the one or more optimization techniques; and processor electronics in communication with the memory, the processor electronics configured to perform operations comprising:
executing the program executable,
analyzing the execution for an indication of at least one of the execution scenarios to select one of the program segment versions based on the indication, wherein analyzing the execution comprises:
- monitoring one or more event counters associated with the one or more execution resources to identify one or more of the execution scenarios during an execution of the program, the event counters comprising a memory bus contention counter and an instruction retirement counter;
- monitoring an instruction retirement rate associated with the execution of the program;
- providing the input associated with the at least one execution scenario to a switching mechanism based on different instruction retirement rate thresholds or a memory bus contention count, the switching mechanism hooking into an execution of the program using a trampoline mechanism that reroutes the execution by setting an active program segment version or combination of program segment versions; and
- selecting one of the program segment versions associated with an execution scenario detected by the monitoring; and causing the execution to use the selected program segment version during at least a portion of the execution.

13. The system of claim 12, wherein executing the program executable comprises:
first executing a first one of the program segment versions; and
second executing a second one of the program segment versions.

14. The system of claim 13, wherein analyzing the execution comprises:
comparing a first performance metric associated with the first executing and a second performance metric associated with the second executing; and
selecting a program segment version based on an output of the comparison.

15. The system of claim 12, wherein monitoring the execution comprises accessing one or more event counters associated with processor electronics.

16. The system of claim 12, wherein executing the program executable comprises accessing one or more of the program segment versions in the program executable, wherein the program segment versions include different program segment versions based on different optimizations of the program segment.

17. The system of claim 12, wherein executing the program executable comprises interfacing with a module that includes the program segment versions.

18. The system of claim 12, wherein executing the program executable comprises the analyzing.

* * * * *